UNITED STATES PATENT OFFICE.

JOHN DEAN, OF RACINE, WISCONSIN.

ART OF TINNING OR SOLDERING ALUMINUM.

1,340,264.   Specification of Letters Patent.   Patented May 18, 1920.

No Drawing.   Application filed August 11, 1919.   Serial No. 316,636.

*To all whom it may concern:*

Be it known that I, JOHN DEAN, a citizen of the United States of America, and resident of Racine, Racine county, State of Wisconsin, have invented certain new and useful Improvements in and Relating to the Art of Tinning or Soldering Aluminum, of which the following is a specification.

This invention relates to certain improvements in the art of soldering or "tinning" aluminum, and the objects and nature of the invention will be readily understood by those skilled in the art in the light of the following explanation of what I now believe to be the preferred manner of and means to be employed in carrying out my invention.

An object of the invention is to bring the melted solder into contact with the surfaces of the aluminum and like metals and alloys that have been freed of oxid before such surfaces have been exposed for a sufficient length of time to again become oxidized; in other words, to approximately simultaneously clean the aluminum and apply the melted solder to the cleansed surface, particularly where rough or irregular aluminum surfaces are being tinned.

With this and other objects in view, the invention consists in certain novel steps and the utilization of certain means, novel in this connection, as more fully and particularly set forth and specified hereinafter.

Those skilled in the art fully appreciate the difficulties heretofore experienced in soldering and tinning aluminum, particularly where the aluminum being treated has an irregular surface, such as caused by shrink holes, depressions and other defects that must be filled and corrected preparatory to finishing the casting to proper size and shape.

Heretofore, it has been exceedingly difficult to remove the oxid thoroughly from all portions of such irregular surfaces and then quickly and thoroughly apply the melted solder to such surfaces while clean and thereby enable the solder to uniformly alloy with all portions of such surfaces.

I have discovered that this difficulty can be overcome if a suitable rubber is employed, one that possesses the characteristics of quickly and easily removing the oxid from all portions of the aluminum surface being treated, and of serving as a "carrier" for the melted solder to apply the melted solder to such surface approximately simultaneously with the removal of the oxid from such surface.

I prefer to employ a pad, roll, body, or mass of steel wool to serve as or constitute the rubber. Steel melts at a much higher temperature than aluminum, and the steel fibers are exceedingly flexible and quickly and readily reached and search out all portions of an irregular surface, and furthermore such steel fibers possess numerous sharp edges that quickly and easily remove the oxid from the aluminum. Also, the mass of closely arranged fine fibers serves to hold and carry a substantial body of melted solder and apply the same directly to the aluminum surface as the oxid is removed therefrom.

In carrying out my method, the aluminum is heated to or slightly above the melting point of the solder to be applied. For instance, the melting point of the solder usually employed is approximately 600° F. A sufficient quantity of the solder is then melted on the aluminum surface to be tinned. The surface to be tinned is then more or less vigorously rubbed with a wad or pad of steel wool held in the hand directly or through the medium of a suitable handle or other holder. The body of steel wool takes up or carries the melted solder on the aluminum and applies the same directly to the aluminum surface as that surface is freed from oxid. The solder flows freely in the mass of steel wool and is carried thereby to all portions of the aluminum surface rubbed by the wool. The great multiplicity of hard fine steel wool fibers seek out and abrade the oxid from all portions of the aluminum surface rubbed by the pad, and the body of molten solder carried along by the pad is thus brought instantaneously into intimate contact with the cleansed aluminum surface and alloys therewith and the resulting alloy and solder become in effect an integral part of the body of aluminum.

In practice, I find that the tinning operation by my method can be very quickly completed and can be performed without reheating the common solder usually employed. Any suitable aluminum solder can be employed as will be readily understood by those skilled in the art. For instance, such a solder can be composed of an alloy of zinc, tin and lead, etc.

While as at present advised by experience, I prefer to employ a rubber composed of a mass of steel wool, yet I do not wish to so limit all features of my invention, as other materials possessing the approximate characteristics for my purposes of steel wool, might be employed. For instance, I can employ a steel or like hard metal brush where the bristles are sufficiently fine and closely arranged to possess the characteristics of steel wool as a carrier for the body of molten solder without chilling the same and sufficiently hard, flexible, and sharp to abrade and search out all rubbed portions of the aluminum surface and where the metal of such bristles is harder than aluminum and has a higher melting point.

In other words, the rubber should be of material that will not chill the solder but will carry along the molten mass while flowing freely, a material that will not fuse at the temperature employed, a material that will cut or otherwise abrade the oxid from the aluminum surface, and a material that is soft, yielding or flexible to search out and abrade all portions of the surface being rubbed to uniformly clean the same and distribute the solder thereover.

It is evident that various changes and variations might be resorted to without departing from the spirit and scope of my invention and hence I do not wish to limit myself to the exact disclosure hereof.

What I claim is:—

1. In the art of tinning or soldering aluminum, that step which consists in abrading the hot aluminum surface and applying the molten solder thereto by a mass of steel wool.

2. In the method of soldering or tinning aluminum, that step which consists in cleaning the surface and applying the molten solder by a rubber composed of a mass of hard flexible fibers having the characteristics of steel wool that will abrade the oxid from the aluminum surface, will not fuse at the temperature employed, and will carry the molten solder within the body of the mass of fibers.

3. In the art of tinning or soldering aluminum, the method which includes heating the aluminum to the fusing point of the solder employed, and carrying a body of melted solder over the aluminum surface to be tinned by a rubber composed of steel wool while said rubber is abrading said surface to remove oxid therefrom, whereby said rubber simultaneously cleans said surface and applies the molten solder thereto.

4. In the art of applying solder to aluminum and like metals, that step which consists in mechanically scraping and cleaning the heated aluminum surface and simultaneously carrying the body of molten solder over and applying the same to the surface by a rubber composed of a body of steel wool.

JOHN DEAN.